3,016,386
ACYLTHIO-STEROIDS AND PRODUCTION THEREOF

Taichiro Komeno, Sumiyoshi-ku, Osaka-shi, Japan, assignor to Shionogi & Co., Ltd., Osaka-shi, Japan
No Drawing. Filed July 22, 1960, Ser. No. 44,514
Claims priority, application Japan Aug. 6, 1959
6 Claims. (Cl. 260—397.2)

This invention relates to acylthio-steroids and to methods for their preparation. More particularly, the invention concerns a novel method for the preparation of novel acylthio derivatives of steroids, which are useful as anti-metabolites of steroidal hormones or as intermediates in the synthesis thereof.

Recently, biochemical activity of organic compounds containing sulfur has been noted and some attempts have been made to introduce an acylthio group into the steroid nucleus. For example, R. M. Dodson et al. had reported as to addition of alkanethiolic acids to $\Delta^{1,4}$-3-oxo- and $\Delta^{4,6}$-3-oxo-steroids, which was carried out by refluxing in a suitable solvent to yield 1-acylthio- and 7-acylthio-steroids, respectively.

It has been found, however, in accordance with the present invention that $\Delta^4$-3-oxo-steroids are converted into 5α-acylthiosteroids without any heating, preferably under conditions suited to radical mechanism.

Accordingly, it is the fundamental object of this invention to provide 5α-acylthio-steroids having therapeutic utility and a method of producing them. Another object of this invention is the provision of a preliminary step of a series of processes whereby introduction of effective sulfur-containing groups into the steroid nucleus may be achieved.

The method of the present invention is generally applicable to the $\Delta^4$-3-oxo-steroids. The reaction of the present invention may be carried out by dissolving $\Delta^4$-3-oxo-steroids in alkanethiolic acid, and then allowing the reaction mixture to stand at room temperature. As this reaction seems to proceed by radical mechanism, it is desirable to carry out the reaction in the presence of a catalyst, such as organic peroxide or the like. Alternatively, irradiation by ultraviolet rays may be effective for promotion of the reaction. Though the reaction is generally performed without any solvent, a suitable reaction solvent such as ether, tetrahydrofuran, dioxane, benzene, or the like may be employed.

This invention is distinguished from Dodson's report, which is most similar to the invented method at present, as follows:

|  | The invented method | Dodson's method |
|---|---|---|
| Reaction temperature | room temperature | refluxing temperature. |
| Reaction solvent | not generally used | generally used. |
| Starting materials | $\Delta^4$-3-oxo-steroids | $\Delta^{1,4}$-3-oxo- and $\Delta^{4,6}$-3-oxo-steroids. |
| Products | 5α-acylthio-steroids | 1α- and 7α-acylthio-steroids. |

The product obtained is valuable medicinally as an antigonadotropic agent or an intermediate for the preparation of such agent.

For example, 5α-acetylthio-dihydro-testosterone propionate (5α-acetylthio-17β-propionyloxy-androstan-3-one) is approximately equal to the parent compound in potency in the gonadotrophin inhibition test, and the androgenic activity of the compound is only 27 percent of the parent compound in the androgenic test. This result shows the usefulness of the product as an anti-gonadotropic agent.

In analogous manner, any of the other intermediates of the instant invention can be converted to the corresponding end-product.

The following specific examples serve to illustrate this invention, but are not intended to limit the scope of the same.

Example 1

4 g. of 4-cholesten-3-one and 400 mg. of benzoylperoxide were dissolved in 20 ml. of ethanethiolic acid, and allowed to stand for 5 days at room temperature. Removing ethanethiolic acid in vacuo, the residue was dissolved in ether, and washed with sodium carbonate solution thoroughly to eliminate the acid. Distilling off the solvent, the residue was chromatographed on 120 g. of Florisil. After recovering 4-cholestene-3-one eluted with petr. ether-benzene (3:1, 2:1 and 1:1), the fraction eluted with benzene-ether was recrystallized from methanol to yield 200 mg. of 5α-acetylthio-cholestan-3-one as flat needles, M.P. 180–182° C.

I.R. (Nujol) μ: 5.81 (3-ketone); 5.92, 8.94, 9.00 (acetylthio). U.V. (EtOH) mμ: 234 (ε: 6000).

$$[\alpha]_D^{20} + 40° \pm 2°$$

(c: 0.591 chloroform).

Anal.—Calcd. for $C_{29}H_{48}O_2S$: C, 75.60; H, 10.50; S, 6.96. Found: C, 75.89; H, 10.78; S, 6.80.

Example 2

4 g. of 17β-propionyloxy-4-androsten-3-one (testosterone propionate) and 400 mg. of benzoyl peroxide were dissolved in 5 ml. of ethanethiolic acid, and allowed to stand for 7 days at room temperature.

After the removal of the ethanethiolic acid, the residue was treated with methanol to yield 750 mg. of crude crystals, M.P. 120–140° C. Recrystallizing from methanol, 180 mg. of 5α-acetylthio-17β-propionyloxy-androstan-3-one (5α-acetylthio-dihydro-testosterone propionate) were obtained as needles, M.P. 194–196° C.

I.R. (Nujol) μ: 5.78, 8.43 (propionyloxy); 5.92, 8.98, 9.21 (acetylthio). U.V. (EtOH) mμ: 233 (ε: 4900). $[\alpha]_D^{20} + 35.5° \pm 3°$ (c: 0.774 chloroform).

Anal.—Calcd. for $C_{24}H_{36}O_4S$: C, 68.53; H, 8.63; S, 7.62. Found: C, 68.63; H, 8.75; S, 7.82.

Various changes and modifications may be made in the method of the present invention without departing from the spirit or scope thereof, and it is to be understood that the sole limitations intended are those defined in the appended claims.

Thus describing my invention, I claim:

1. 5α-acetylthio-cholestan-3-one.
2. 5α-acetylthio-17β-propionyloxy-androstan-3-one.
3. A process for the preparation of 5α-acylthio-cholestan-3-one which comprises treating 4-cholesten-3-one with alkanethiolic acid at room temperature in the presence of organic peroxide, whereby the acylthio group is introduced into the 5α-position, and recovering the resultant 5α-acylthio-cholestan-3-one.
4. A process for the preparation of 5α-acylthio-17β-propionyloxy-androstan-3-one which comprises treating 17β-propionyloxy-4-androsten-3-one with alkanethiolic acid at room temperature in the presence of organic peroxide, whereby the acylthio group is introduced into the 5α-position, and recovering the resultant 5α-acylthio-17β-propionyloxy-androstan-3-one.
5. A process for the preparation of 5α-acetylthio-cholestan-3-one which comprises treating 4-cholesten-3-one with ethanethiolic acid at room temperature in the presence of benzoyl peroxide, whereby the acetylthio group is introduced into the 5α-position, and recovering the resultant 5α-acetylthio-cholestan-3-one.

6. A process for the preparation of 5α-acetylthio-17β-propionyloxy-androstan-3-one which comprises treating 17β-propionyloxy-4-androsten-3-one with ethanethiolic acid at room temperature in the presence of benzoyl peroxide, whereby the acetylthio group is introduced into the 5α-position, and recovering the resultant 5α-acetylthio-17β-propionyloxy-androstan-3-one.

References Cited in the file of this patent

Dodson et al.: J.A.C.S. 81, 1224–1227, Mar. 19, 1959.